United States Patent Office.

WILHELM MAJERT, OF FALKENBERG, GERMANY.

PYROCATECHIN MONO-ACETIC ACID AND PROCESS OF MAKING SAME.

SPECIFICATION forming part of Letters Patent No. 557,410, dated March 31, 1896.

Application filed September 27, 1895. Serial No. 563,896. (No specimens.)

*To all whom it may concern:*

Be it known that I, WILHELM MAJERT, a subject of the King of Prussia, German Emperor, and a resident of Falkenberg, near Grünau, Prussia, Germany, have invented a new Chemical Compound—viz., Pyrocatechin Mono-Acetic Acid—and Process of Manufacturing the Same, of which the following is a full, clear, and exact description.

Mono-acetic acids of dihydric phenols have not hitherto been produced.

According to the investigations of Auwers and Haymann (*Berichte* $27^3$, p. 2804) pyrocatechin mono-acetic acid is not formed by the action of chloracetoethyl esters on pyrocatechin monosodium. When working according to the process described in the above publication, 8.7 grams of pure unaltered pyrocatechin were recovered from ten grams of pyrocatechin. A similar result was obtained by the action of chloracetoethyl ester on dry pyrocatechin monosodium dissolved in xylol. These results are surprising, the more so as under the same conditions guaiacol and pyrocatechin mono-ethyl esters are formed in good quantities from pyrocatechin monosodium and methyliodid or bromethylene, respectively, and also in view of the fact that chloracetic esters behave similarly to the halogen alkylenes in the presence of salts of monohydric phenols. The salts of chloracetic acid, however, react quite differently from the esters of said acid on pyrocatechin monosodium. The reaction of the said salts yields a comparatively considerable quantity of pyrocatechin mono-acetic acid. Pyrocatechin monoacetate of sodium has proved a very valuable remedy for consumption and loss of appetite, and is very much superior to guaiacol and carbonate of guaiacol. Its effect when taken in doses of twice 0.5 grams to six times 0.5 grams per day is to considerably improve the appetite of persons suffering from consumption, to completely stop nightly perspiration, to reduce the evening temperature, and in mild cases to entirely destroy the bacilli of the disease. In all cases it is readily taken and retained by the patients.

Pyrocatechin mono-acetic acid is obtained by subjecting one molecule of chloracetic acid to the action of one molecule of pyrocatechin in the presence of free carbonate of a free alkali or carbonate of alkali.

The process is as follows: 8.25 kilograms of chloracetic acid and eleven kilograms of pyrocatechin are dissolved in forty-five parts of water. The solution is boiled under an inverted condenser, and gradually there is added thereto a solution of eight kilograms of hydroxid of sodium in twenty parts of water or a corresponding quantity of a soda solution, the boiling being continued until the solution is neutralized.

After cooling, the solution solidifies, forming a paste of crystals of pyrocatechin monoacetate of sodium. The mother-lye is drawn off and the salt is purified by dissolving it in water and allowing it to crystallize again. The acid separated from the salt has the following constitution:

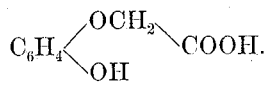

It is fairly well soluble in water, and when crystallized from the solution forms white needles which melt at about 131° centigrade. By melting these crystals (or the result is obtained more quickly by heating above the melting-point) the acid is converted into its lactone,

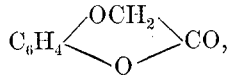

which melts at about 56° centigrade.

Having thus described my invention, I claim as new and desire to secure by Letters Patent—

1. The herein-described process of producing pyrocatechin mono-acetic acid, which consists in subjecting one molecule of pyrocatechin to the action of one molecule of chloracetic acid in the presence of an alkali or the carbonate of an alkali, substantially as set forth.

2. The herein-described new chemical compound viz: catechin mono-acetic acid, which melts at 131° centigrade and whose constitution is represented by the formula

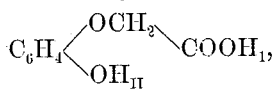

said substance when heated above its melting-point being converted into the lactone

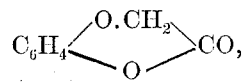

melts at 54° to 56° centigrade; the new compound being obtained by the action of one molecule of chloracetic acid on one molecule of catechin in the presence of free, that is, uncombined alkali, or carbonate of alkali, substantially as set forth.

In witness whereof I have hereunto set my hand in presence of two witnesses.

WILHELM MAJERT.

Witnesses:
   MAX SCHÜTZE,
   WILHELM SCHWIETHAL.